United States Patent [19]

Schoneberger

[11] Patent Number: 4,491,833
[45] Date of Patent: Jan. 1, 1985

[54] EQUIPMENT FOR INDICATION OF THE ELECTRICALLY MEASURABLE POSITIONS OR ADJUSTMENTS OF INDIVIDUAL UNITS REQUIRED FOR THE PRINTING PROCESS

[75] Inventor: Edgar F. Schoneberger, Seligenstadt, Fed. Rep. of Germany

[73] Assignee: M.A.N.-Roland Druckmaschinen Aktiengesellschaft, Offenbach am Main, Fed. Rep. of Germany

[21] Appl. No.: 348,495

[22] Filed: Feb. 12, 1982

Related U.S. Application Data

[63] Continuation-in-part of Ser. No. 277,955, Jun. 26, 1981.

[30] Foreign Application Priority Data

Jun. 28, 1980 [DE] Fed. Rep. of Germany ....... 3024452

[51] Int. Cl.³ .............................................. G09G 1/00
[52] U.S. Cl. ..................................... 340/721; 340/732; 101/181
[58] Field of Search .................... 340/870.13, 732, 736, 340/739, 742, 721; 101/181, 183, 180

[56] References Cited

U.S. PATENT DOCUMENTS

| 3,474,438 | 10/1969 | Lauher | 340/732 |
|---|---|---|---|
| 3,520,253 | 7/1970 | Head | 101/181 |
| 3,872,461 | 3/1975 | Jarosik et al. | 340/721 |
| 3,915,090 | 10/1975 | Horst et al. | 101/181 |
| 4,033,259 | 7/1977 | Schuhmann | 101/174 |
| 4,257,043 | 3/1981 | Tsuchiko | 340/721 |
| 4,302,755 | 11/1981 | Pisani et al. | 340/721 |
| 4,742,849 | 7/1973 | Greiner et al. | 101/248 |

FOREIGN PATENT DOCUMENTS 7245711  5/1976  Fed. Rep. of Germany .

OTHER PUBLICATIONS

Heidelberg Offset CPC Brochure, published at Dupra, Jun. 3-16, 1977.
Der Polygraph (MAVO article), 10/22/75, pp. 1393-1400.

Primary Examiner—Gerald L. Brigance
Attorney, Agent, or Firm—Leydig, Voit, Osann, Mayer & Holt, Ltd.

[57] ABSTRACT

A device for indicating electrically measurable positions or adjustments of individual units required for the printing process, and displaying the positions or adjustments in the form of lines, segments or areas on a large-area indicating instrument. The actual values of the respective positions or adjustments of different units are freely selectable and can be represented on the indicating instrument pictorally and/or symbolically. A cathode-ray tube, LED-matrix or LCD-matrix, for example, can be used as indicating instruments.

12 Claims, 8 Drawing Figures

EQUIPMENT FOR INDICATION OF THE ELECTRICALLY MEASURABLE POSITIONS OR ADJUSTMENTS OF INDIVIDUAL UNITS REQUIRED FOR THE PRINTING PROCESS

RELATED APPLICATION

The present application is a continuation-in-part of Application Ser. No. 277,955 filed on June 26, 1981. Foreign priority is based on German Application No. P 30 24 452.1 filed June 28, 1980.

BACKGROUND OF THE INVENTION

1. Field of the Invention

The invention relates to equipment for indicating the position and/or adjustment of individual units required for the printing process. The invention more specifically relates to remote indication of individual units at a central location.

2. Description of the Prior Art

Various means have been devised for the adjustment of the plates in a rotary printing press. Adjustment becomes especially critical for printing plates on a printing cylinder of a multi-color printing press. Sigfried Schuhmann in U.S. Pat. No. 4,033,259 issued July 5, 1977, discloses an apparatus for the peripheral adjustment of a printing plate on a printing cylinder of a multi-color printing press in the form of an optical viewing device having magnifying optics including a single eye piece and two objectives. The objectives are spaced for simultaneous viewing at a peripheral reference mark at the end of the cylinder and an index mark on the plate which is positionally related to the image thereon. At Column 5, line 26, Schuhmann discloses that remote displays can be provided by using fiber optics to convey the optical image.

Similarly simultaneous adjustment of blanket cylinders is required in lithograph presses that simultaneously print on both sides of a copy by passing a web between a pair of blanket cylinders. Greiner U.S. Pat. No. 3,742,849 issued July 3, 1973 discloses a coupling arrangement between blanket cylinders using gears to keep the blanket cylinders operating exactly at the same peripheral speed under running conditions with an interposed clutch to permit the blanket cylinders to be disengaged for individual phase adjustment when the press is running.

On the currently marketed printing presses an increasing number of units can be remotely controlled from a control panel at a central location. Indicators are also provided on the control panel. The adjustments or positions are displayed in digital or analog form by these indicators. An appropriate number of indicators are provided accordingly to the number of remotely controllable units on the printing press. Whereas only one indicating instrument is usually required for indication of an adjustment, two instruments may be required for indication of the positions. The amount of space required to house the indicating instruments increases as other remotely controllable units are added.

SUMMARY OF THE INVENTION

The general aim of the invention is to provide an arrangement which permits the representation of all indications for the position and adjustment of the individual remotely controllable units to be centrally located on a large-area indicating instrument.

Another object of the invention is to provide a large-area indicating instrument that provides pictoral and symbolic representation of the indications for the position and adjustment of individual remotely controllable units.

Still another objective of the invention is to decrease the space required on a central control panel to indicate all of the positions and adjustments of individual remotely controllable units.

Still another objective of the invention is to increase the number of particular positions which may be displayed on a large-area indicating instrument.

In accordance with the invention, a number of scanning displacement transducers supply signals corresponding to momentary positions and adjustments of the individual remotely controllable units. These individual scanner signals are multiplexed by a change-over switch selected by push buttons on a control panel, or which could be selected by a supervising control system. The selected signals then are conveyed to a central location where they are individually displayed on a large scale indicating instrument. An operator or a supervising control system may observe the indicated positions or adjustments, and remotely control the individual remotely controllable units to bring the observed positions or adjustments into proper alignment. The electrically measured positions or adjustments of the individual units may be represented in the form of lines, segments or areas on the large-area indicating instrument. Moreover, the actual values of the respective positions or adjustments of different units are freely selectable and can be represented on the indicating instrument pictorally and symbolically. Indicating instruments include cathode ray tube, LED-matrix and LCD-matrix display devices.

Figure 1:
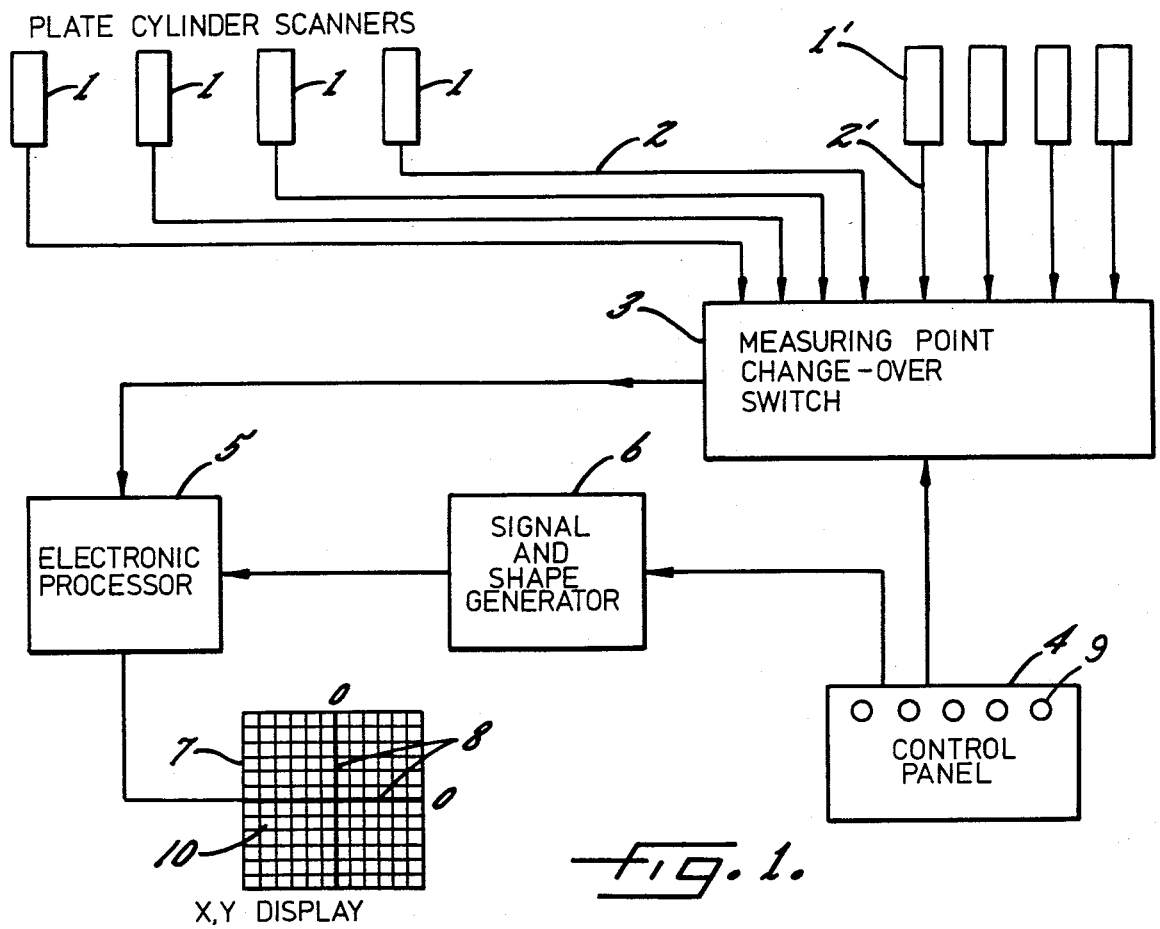
FIG. 1 is a highly schematic block diagram of the system according to the invention for indication of the electrically measurable positions or adjustments of the individual units.

While the invention is susceptible of various modifications and alternative constructions, a certain preferred embodiment has been shown in the drawings and will be described below in considerable detail. It should be understood, however, that there is no intention to limit the invention to the specific form described but, on the contrary, the intention is to cover all modifications, alternative constructions and equivalents falling within the scope of the appended claims.

DETAILED DESCRIPTION OF THE PREFERRED EMBODIMENT

A particularly useful application of the invention is remote control of the adjustment of the register of the lithographic plates mounted on the plate cylinder in a rotary printing press. As shown in schematic form in FIG. 1, suitable scanners (1), which supply signals corresponding to the momentary position of the plate cylinder, are arranged on the remotely adjustable control units (not shown) for the plate cylinder. This signal is fed via a data line (2) to a measuring point change-over switch (3). The data lines (2') of the other scanners (1') are also connected to the measuring point change-over switch (3).

The measuring point change-over switch (3) can be controlled by push buttons (9) on a control panel. A signal and shape generator (6) is likewise connected to the control panel (4).

For indication of a momentary position of a particular plate cylinder with regard to circumferential and axial side register the desired scanner bank (1), (1') is selected by the measuring point change-over switch (3) and the scanner bank signals are routed to an electronic processor (5) by pressing a corresponding push button (9). At the same time a signal and shape generator (6) gives an instruction to the electronic processor (5) as to how the representation has to appear on a large-area indicating instrument (7) shown as an x, y display. The electronic processor (5) then outputs a display control signal to the x, y display (7). In this case a coordinate system (8), for example, can be used for the indication. Any deviation in position can be read off a scale grid (10), which can be faded in at the same time, together with the required zero position of the corresponding plate cylinder. When moving the plate cylinder into its required position the scale of the grid (10) can be varied to permit accurate register adjustment.

In accordance with the arrangement in FIG. 1, all positions and adjustments of numerous remotely controllable adjusting units used on at least one printing press can be displayed.

Figure 2:
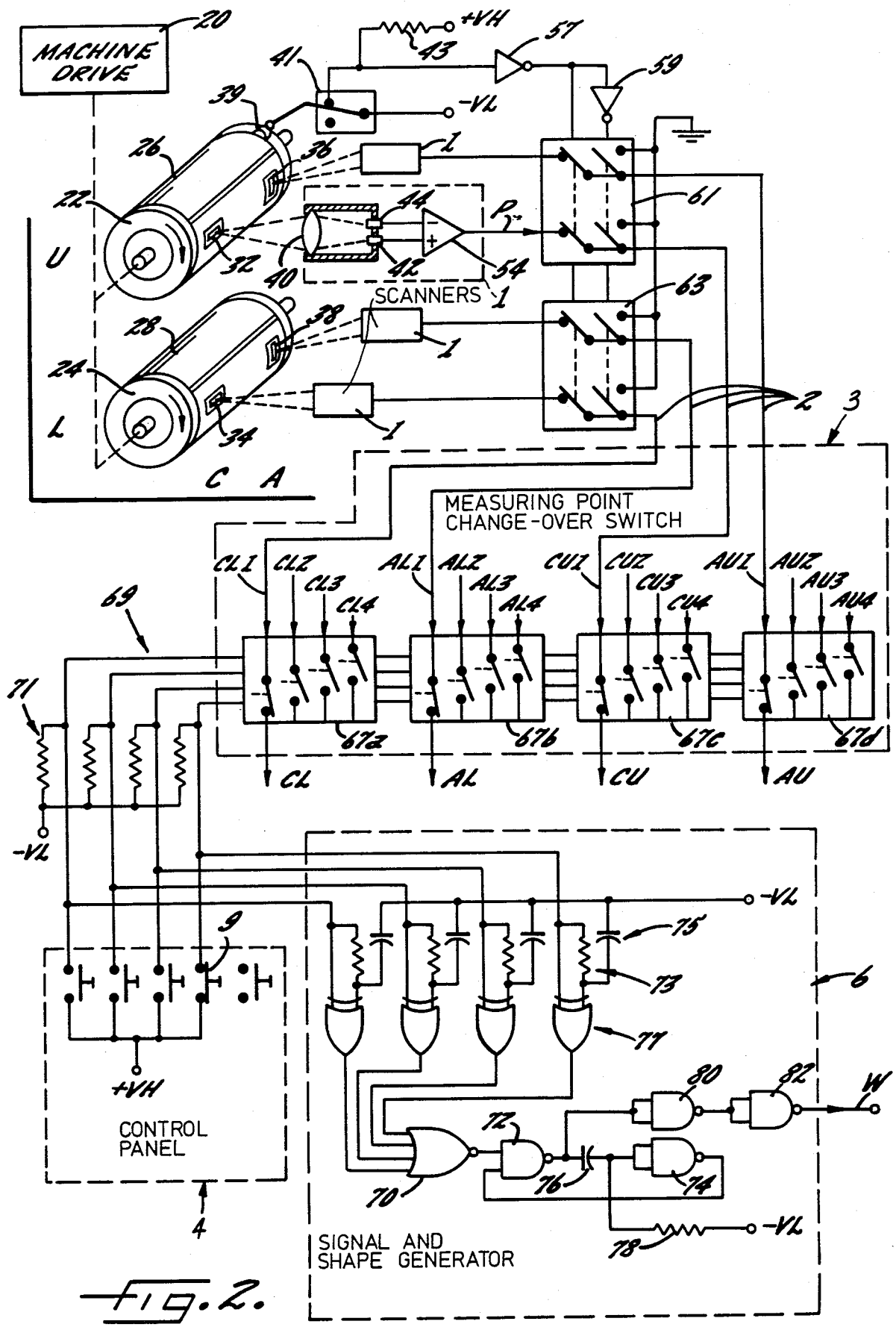
FIG. 2 is a more detailed electronic schematic of suitable scanners for measuring the circumferential and axial position of plate cylinders in a printing press using photosensing scanners, a change-over switch, control panel push buttons, and a signal and shape generator for detecting when the push buttons have selected a new bank of scanners.

Turning now to the detailed schematic in FIG. 2, a machine drive (20) is connected to two plate cylinders (22) and (24). Mounted on the plate cylinders (22), (24) are lithograph plates (26) and (28), respectively, each printing a different color so that the lithograph plates (26), (28) must be brought in axial side register and in circumferential register so that the different colors are printed in precisely the desired relative locations on the paper (not shown). For circumferential register, timing marks (32), (34) are provided on the edges of the lithograph plate (26), (28). Similarly timing marks (36), (38) are provided on the lithographic plates for axial side register. Suitable photosensing position sensors (1) are provided for optically reading the precise location of the timing marks (32), (34), (36), (38). For the purpose of identifying the signals generated by the scanners (1) a convention will be followed where the signals indicating the adjustment of the upper plate cylinder (2) will be designated by a capital letter (U), and signals originating from the lower plate cylinder (24) will be designated by the capital letter (L). The timing marks (32), (34) indicating peripheral register will be identified by the capital letter (C) while the timing marks (36), (38) identifying axial side position will be identified by the capital letter (A).

Figure 3:
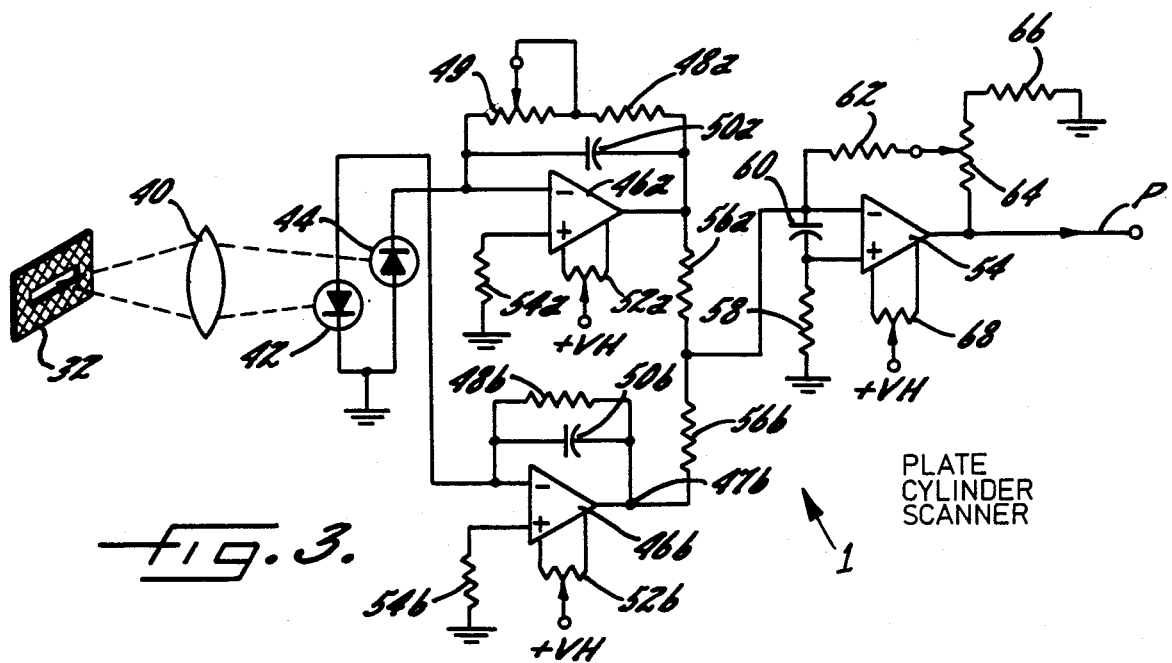
FIG. 3 is a detailed electronic schematic of a photosensing position scanner employing differential amplifiers.

Turning momentarily to FIG. 3, the circuits inside the photo scanners (1) are shown in detail. Light reflected from a timing mark (32) is focused by a lens (40) to form an image just between two closely positioned photodiodes (42), (44). The photodiode current generated by the light from the timing mark 32 is amplified by differential amplifiers (46a), (46b) and translated into a voltage at the output node (47a), (47b). Feedback resistors (48a), (48b) set the gain of the amplifiers (46a), (46b). In addition, a potentiometer (49) is put in series with feedback resistor (48a) so that the gain of operational amplifier (46a) may be set slightly different than the gain of operational amplifier (46b) so that the mismatch in conversion gain of the photodiode (42) versus the photodiode (44) may be compensated for. Capacitors (50a) and (50b) are also placed in the feedback path to attenuate high frequency noise. Bias resistors (54a) and (54b) are used to minimize amplifier drift so that the amplifiers (46a), (46b) see approximately equal resistances to ground from their input terminals. Potentiometers (52a), (52b) are provided to null out the offset of the amplifiers (46a), (46b). Nominal component values are 1.5 megohms for resistors (48a), 2 megohms for resistor (48b), 1 megohm for resistor (49), 470 picofarads for capacitors (50a), (50b), 2 megohms for resistors (54a), (54b) and 10 Kohms for resistors (52a), (52b). The signals at the amplifier output nodes (47a), (47b) are fed to a combining differential amplifier (54) through summing resistors (56a), (56b), nominally 30 Kohms. A noise filtering capacitor (60), nominally 0.02 microfarads, shunts the inputs of the amplifier (54). The gain of the amplifier (54) is set by a feedback network comprising a feedback resistor (62) nominally 1 megohm, a gain setting potentiometer (64), nominally 5 Kohms, and a maximum gain setting resistor (66) nominally 470 ohms. The positive input of the amplifier (54) is grounded through a resistor (58), nominally 15 Kohms. A 10 Kohms potentiometer (68) is also provided to null out the offset of the amplifier (54). Comparing amplifier (54) computes the difference in signals from the photodiodes (42) versus (44), appearing at an output labeled (P). The potentiometers in the circuit of FIG. 3 are adjusted by cutting off all light through the lens (40) and then adjusting the offset potentiometers (52a), (52b) so that the voltages on the output nodes (47a), (47b) are zero. Thereafter, the offset adjusting potentiometer (68) of the comparing amplifier (54) is adjusted so that the voltage at the output node (P) is zero. Then the lens (40) is uncovered allowing a moderate level of light to reach the photodiodes (42), (44). For this purpose the light entering the lens (40) should be diffuse so that diodes (42) and (44) receive approximately the same light level. Then the offset gain adjusting potentiometer (49) may be adjusted away from its middle position so that the output voltage at the output node (P) becomes zero. Once the amplifier in FIG. 3 is adjusted in this manner, the output voltage at the output node (P) is very sensitive to the difference in light intensity reaching diode (42) versus diode (44), and thus is an indication of the position of a light image focused between the two diodes.

Note that the photoscanner of FIG. 3 could read timing marks off moving sheets of paper as well as moving parts of a printing press, and thus is capable of measuring positions of workpieces moving through a machine as well as the proper adjustment of the machine parts. In other words, the photoscanner of FIG. 3 may measure any displacement parameter affecting the printing process.

Returning now to the detailed schematic in FIG. 2, the outputs of the photoscanners such as output (P) are fed to a set of electronic switches in IC packages (61) and (63), preferably CMOS part No. 4016. The electronic switches are controlled by a cam switch (41) responsive to a cam (39) affixed to the upper plate cylinder (22) and closing the switch (41) when the photosensors (1) are generally focused on the timing marks (32), (34), (36), (38). Of course, a Hall-effect or optical cam switch rather than a mechanical switch could be substituted. The cam switch (41) in cooperation with a pull-up resistor (43) tied to the positive supply voltage (+VH) in conjunction with inverters (57) and (59), activate the electronic switches (61), (63) so that when the photoscanners (1) are generally focused on the timing marks (32), (34), (36), (38) the scanners (1) are connected to the output lines (2), but if the scanners (1) are not focused generally on the timing marks (32), (34), (36), (38) the electronic switches (61), (63) assure that the output lines (2) are at ground.

The output lines (2) are then fed to the change-over switch generally designated (3) comprising electronic switches (67a), (67b), (67c), and (67d), preferably CMOS switches part no. 4016. Four control lines generally designated (69) are provided so that the electronic switches (67a), (67b), (67c), (67d) switch one of four machine inputs; for example, the electronic switch (67a) may select either output line (CL1), (CL2), (CL3), or (CL4). Thus four outputs are provided from the change-over switch (3); these are, (CL), (AL), (CU), and (AU). Mechanical interlocks in the control panel push button assembly (4) insure that only one of the four control lines (69) is active at any one time. Pull-down resistors generally designated (71) disable the control lines (69) when the push button switches are not activated.

A signal and shape generator (6) generates an active wait signal (W) for a sufficient time period after a new push button is selected so that the circuits may respond. For this purpose resistor-capacitor delay networks employing resistors generally designated (73) and capacitors generally designated (75) cooperate with a bank of exclusive-OR gates generally designated (77) so that any change in the logic state on the control lines (69) triggers one of the exclusive-OR gates (77) which in turn activates a NOR gate (70) which fires a one-shot comprising NAND gates (72) and (74) with the one-shot time interval determined by the RC product of capacitor (76) and resistor (78). The one-shot output is buffered by NAND gates (80) and (82) to provide the wait signal (W).

Figure 4:
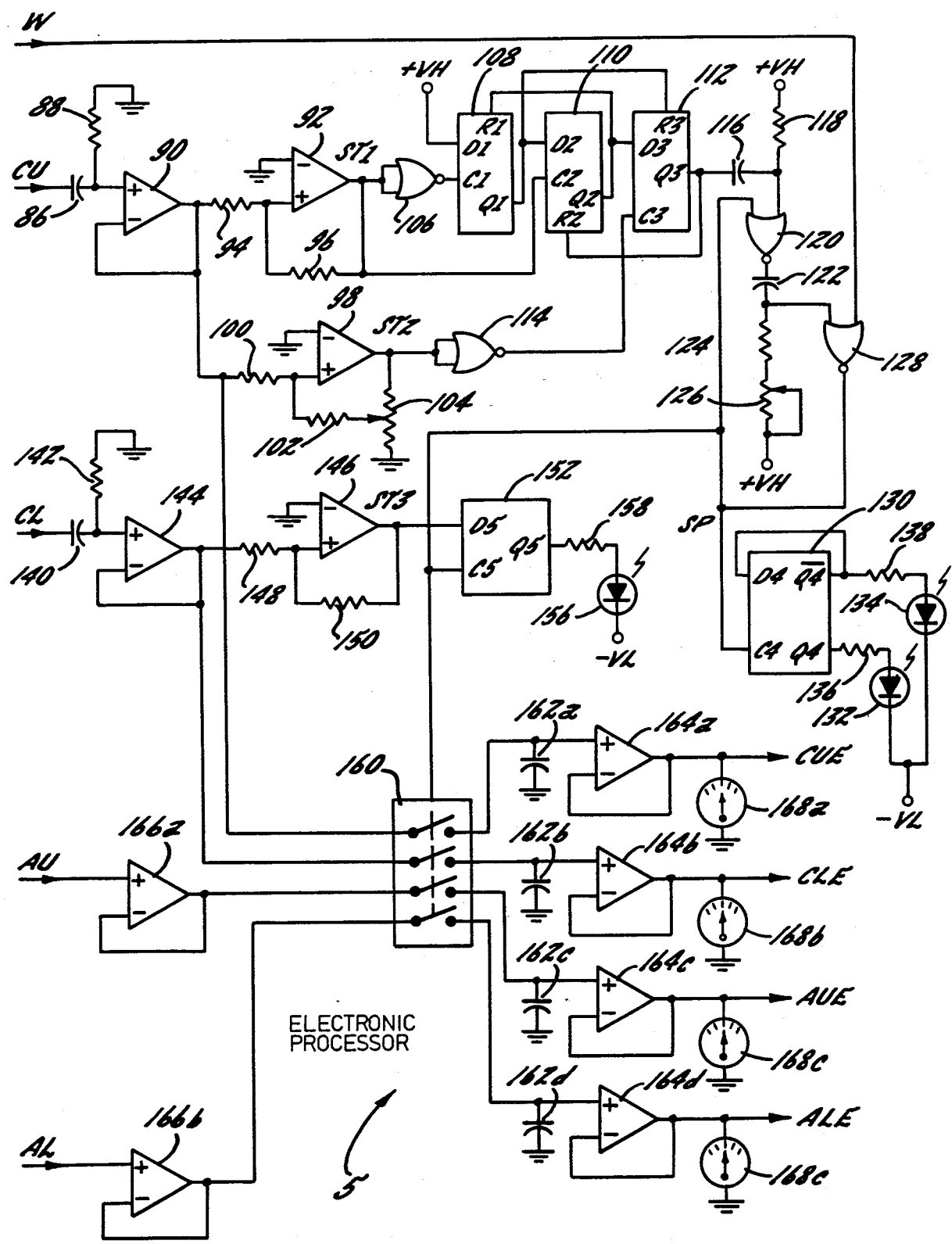
FIG. 4 is a detailed schematic of the electronic processor for converting the selected scanner signals to error signals representing the error in position or adjustment.
Figure 5:
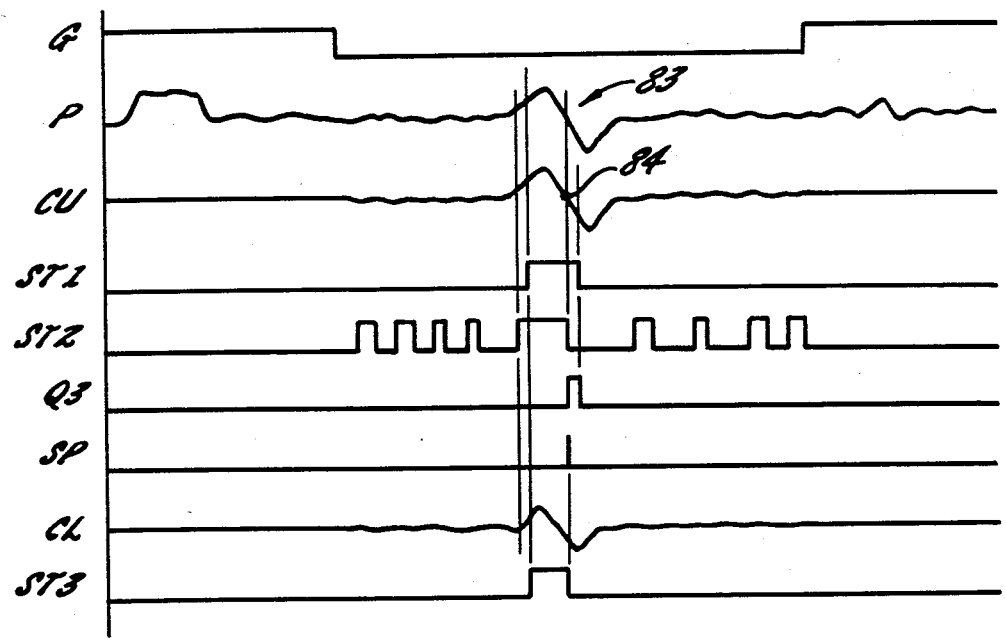
FIG. 5 is a timing diagram, showing how the scanner signals are detected to give error signals.

The detector circuits in the electronic processor generally designated (5) are shown in FIG. 4. The circuits in FIG. 4 may be more easily understood by simultaneous reference to the corresponding timing diagram in FIG. 5. One of the peripheral signals, such as (CU) in FIG. 4, is selected as the timing reference signal. During the time the scanners (1) are responsive to the timing marks (32), (34), (36), (38), the cam switch (41) signal (G) is low. Thus the electronic switches (61), (63) insure that the reference signal (CU) is at ground potential when the scanner is not looking at the timing mark (32), but when it is looking at the timing mark, the sensor output (P) is selected. The signal (CU) contains an S-shaped pulse with a zero axis crossing (84) indicating the time when the timing mark (32) is focused immediately between the photodiodes (42), (44). The task of the electronic processor circuit in FIG. 4, generally designated (5), is to detect the zero axis crossing (84) and generate a timing pulse (SP). The timing reference signal (CU) is fed through a high-pass filter comprising a by-pass capacitor (86) and bias resistor (88), with component values selected so that the RC time product is approximately equal to the time duration of the S-shaped pulse generally designated (83), so that any DC offset is rejected. An operational amplifier wired as a follower (90) then presents the signal to a Schmitt trigger comprising an operational amplifier (92) and series resistor (94) and positive feedback resistor (96) so that an output signal (ST1) is generated detecting the S-shaped pulse (83). The ratio of the feedback resistance (96) to the series resistance (94) is selected so that the thresholds are high enough so that the operational amplifier (92) triggers only during the S-shaped pulse (83). A second Schmitt trigger comprising an operational amplifier (98) with series resistor (100) and feedback resistor (102) and zero crossing adjusting potentiometer (104) is set to have a very small hysteresis, in the neighborhood of tens of millivolts, to detect the zero axis crossing (84). Then the electronic processor (5) can detect the information-containing falling edge of the second Schmitt trigger output signal (ST2), that occurs just after the leading edge of the first Schmitt trigger output (ST1). To perform this detection function an inverter (106) feeds the first Schmitt trigger signal (ST1) to a rising edge-sensitive clock input (C1) of a D-type flip-flop (108) having its D input (D1) tied to positive logic supply (+VH). Then the flip-flop (108) is set by the falling edge of the first Schmitt trigger (ST1). A second D-type flip-flop (110) with a D input (D2) connected to the output (Q1) of the first flip-flop (108) is clocked via its rising edge-sensitive clock input (C2) by the first Schmitt trigger output signal (ST1) which therefore is set by the leading edge of the first Schmitt trigger signal (ST1) after the first flip-flop (108) is set by the falling edge. Flip-flop (112) is clocked via its rising edge sensitive clock input (C3) by the second Schmitt trigger threshold signal (ST2) inverted by inverter (114). The D input (D3) of the third flip-flop (112) receives the output (Q2) of flip-flop 110 so that the output (Q3) of the third flip-flop (112) is set only after the sequence of first a falling edge of the first Schmitt trigger signal (ST1) followed by a leading edge of the first Schmitt trigger signal (ST1) followed by a falling edge of the second Schmitt trigger signal (ST2). Also the first flip-flop (108) is re-set by the second flip-flop (108) output (Q2) via its re-set input (R1), and the second flip-flop (110) is re-set by the output (Q3) of the third flip-flop (112) via its re-set input (R2) so that any other sequence of edges of the Schmitt trigger output signals (ST1), (ST2) will not result in flip-flop (112) being set. Thus the rising edge of the output (Q3) of the flip-flop (112) detects the proper instant of time for the sampling pulse (SP). The sampling pulse (SP) is generated by a pulse generating capacitor (116) and resistor (118), triggering a one-shot comprising a NOR gate (120), delay capacitor (122) and delay setting resistors (124), (126).

The wait signal (W) is applied to an input of a NOR gate (128) so that the sampling pulse (SP) is not generated during the time that the control panel push button switches (4) are being activated. To give the machine operator a visual indication of proper sampling, the sampling pulse (SP) is fed to a digital divider consisting of a flip-flop (130) wired as a toggle flip-flop by feeding the sampling pulse (SP) to an edge-sensitive clock input (C4), and feeding the complement output ($\overline{Q4}$) back to the D input (D4). The flip-flop (130) outputs (Q4), ($\overline{Q4}$) are then fed to light emitting diodes (LEDs) (132), (134) with current limiting resistors (136) and (138) so that periodic sampling is indicated by a periodic flashing of the LEDs (132), (134).

To give a general indication of proper peripheral alignment of the upper and lower lithograph plates (26), (28) the peripheral signal not selected as a reference (CL), after being fed through a similar high-pass filter comprising a capacitor (140), resistor (142) and follower (144), is fed to a Schmitt trigger comprising an op-amp (146), series resistor (148), and feedback resistor (150) setting high thresholds approximately the same as the thresholds set by the resistors (94) and (96). To detect general synchronism, a D-type flip-flop (152) accepts the Schmitt trigger output (ST3) on its D input (D5) and is clocked by the narrow sampling pulse (SP) applied to the flip-flop's clock input (C5). The output of the flip-flop (Q5) is fed to a light emitting diode (156) through a current limiting resistor (158) so that general synchronism is indicated when the LED (156) is illuminated.

For a more precise indication of the relative adjustments, all of the buffered signals are sampled by a sample and hold circuit consisting of sampler switch (160), CMOS switch part No. 4016, sampling capacitors (162a), (162b), (162c) and (162d), and buffers (164a), (164c) and (164d). The buffered peripheral signals are obtained from buffers (90), (144), while the buffered side or axial sensor signals are obtained from buffers (166a) and (166b). The outputs of the sample and hold buffers (CUE), (CLE), (AUE) and (ALE) are bipolar analog signals indicating the offset of the adjustments. These offsets may be indicated by meters (168a), (168b), (168c), (168d) which may be analog meters, digital panel meters, or any other kind of voltage indicating instrument.

Figure 6:
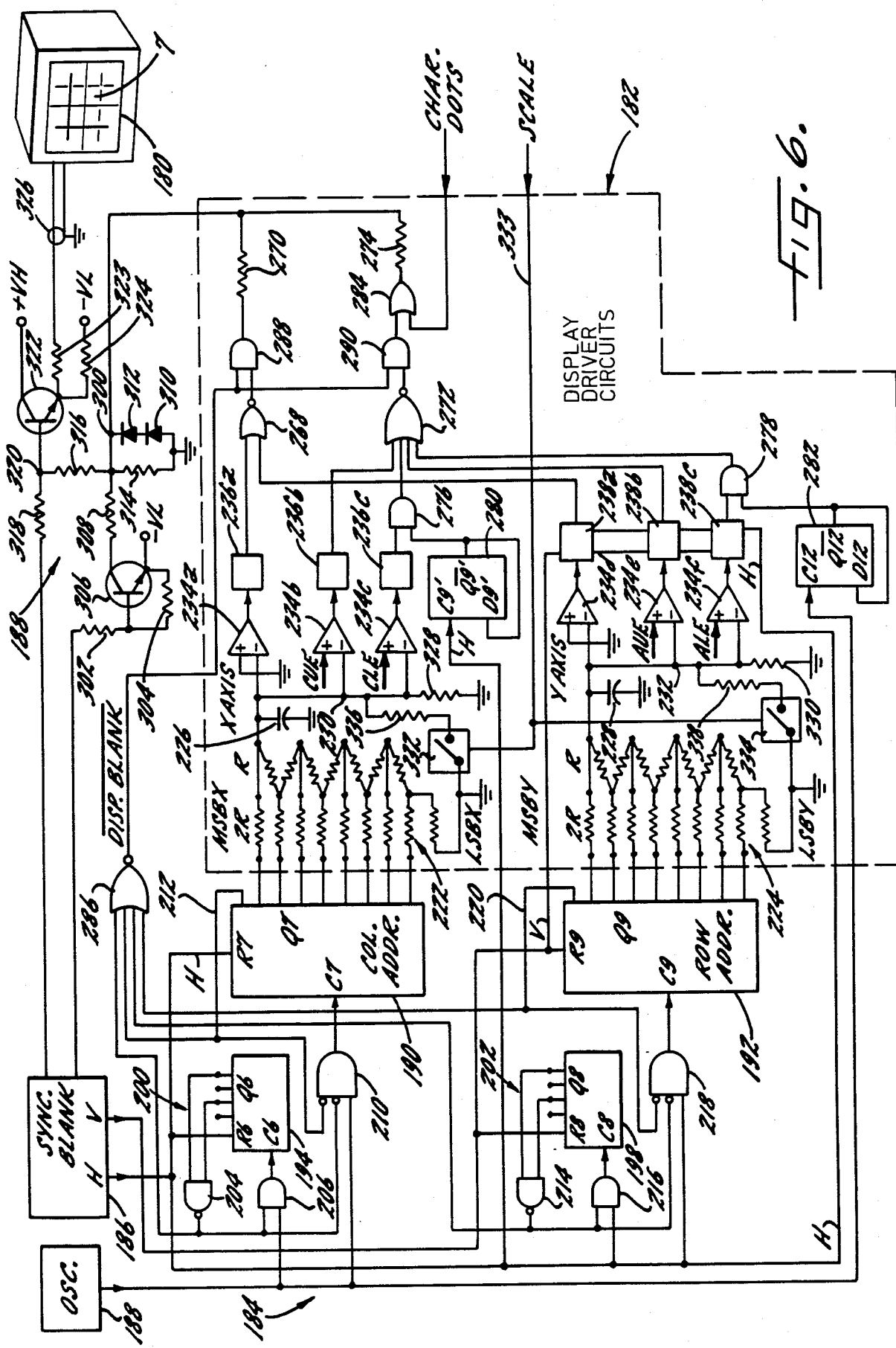
FIG. 6 is a detailed schematic of circuits for displaying the error signals in the form of horizontal and vertical segments on a CRT display.

One particularly useful type of indicator is a cathode ray tube (180). In particular it is advantageous to use the same cathode ray tube that is used in a video terminal for a microcomputer. Then a graphic display of the offset voltages (CUE), (CLE), (AUE), (ALE) may be annotated by characters generated by the microcomputer. As shown in FIG. 6, the circuitry generally designated (182) for indicating the analog voltages may share much of the circuitry generally designated (184) generating the character information on the video display (7).

Typically the cathode ray tube (180) is raster scanned with the scanning synchronization signals (H) for the horizontal and (V) for the vertical being generated by a TV camera chip (186) such as a TV camera sync generator IC part no. MM5320 manufactured by National Semiconductor. Also an oscillator (188) is needed to determine the character dot spacing along the horizontal scan lines. Each character dot then has a column address stored in an address counter (190) specifying its position along the horizontal scan line and a row address stored in an address counter (192) specifying the position number of the horizontal line which includes the character dot. The location of the concatenated address (00,00), for example, designates the coordinates of the origin point scanned when the column address (190) and the row address counter (192) just begin to start counting, and its physical location on the display (7) is determined by a column origin counter (194) and a row origin counter (198). Jumpers generally designated (200) and (202) are used to select the location of the origin point in terms of the number of character dots and the number of horizontal lines displacement from the horizontal sync pulse (H) and the vertical sync pulse (V) before the column address counter (190) and row address counter (192) begin to start counting. The horizontal sync pulse (H), for example, re-sets the column origin counter (194) via its re-set input (R6) and the NAND gate (204) goes high enabling the clock gate (206) to permit clocking pulses to reach the clock input (C6) of the column origin counter (194). Thus the column origin counter (194) counts up until the binary outputs (Q6) that are strapped to the input of the NAND gate (204) all go high. At this time the NAND gate (204) goes low, disabling the clock gate (206). But as soon as the clock gate (206) is disabled, gate (210) enables the clock pulses to reach the clock input (C7) of the column address counter (190). The column address counter (190) also has a most significant bit (MSB) output (212) that feeds back to a disable input of the clock gate (210) so that counting of the column address counter (190) stops when the counter counts up until the output line (212) goes high. The output on line (212) is, however, set to zero to enable further counting cycles by the re-set input (R7), upon the ocurrence of the horizontal sync pulse (H). Similarly, the row origin counter (198) has outputs (Q8) that are strapped via jumpers (202) feeding into a NAND gate (214) to stop the counting of the row origin counter (190) via a gate (216) with an output feeding the clock input (C8). Thus clocking of the row origin counter (198) starts when the vertical syn pulse (V) re-sets the re-set input (R8), and counting stops when the binary number represented by the jumpers (202) is reached. But as clock gate (216) is disabled, clock gate (218) is enabled permitting the row address counter (192) to start counting the pulses received on the clock input (C9). The row address counter (192) continues to count up until the most significant bit (MSB) on output line (220) is reached thus disabling the gate (218). The output line (220) remains high until the row address counter (192) is re-set by the vertical sync pulse (V) activating the re-set input (R9).

In a video character display the column address counter (190) and row address counter (192) specify the addresses of the RAM memory words (not shown) containing the ASCII character codes and also specify the row and column address of the dots in the character matrix ROM (not shown). But for driving the analog indicator circuits generally designated (182), the binary outputs (Q7), (Q9) drive two digital-to-analog converter (R/2R) ladder networks generally designated (222), (224) which in conjunction with integrating capacitors (226), (228) generate linear ramp waveforms synchronized to the raster scanning of the cathode ray tube (180). The ramp waveforms appear on nodes (230) and (232) and are used as comparator references for comparator (234a) receiving ground potential to generate an X-axis, comparator (234b) accepting the analog voltage (CUE), comparator (234c) accepting the analog voltage (CLE), comparator (234d) accepting ground potential to generate a Y-axis, comparator (234e) accepting the analog voltage (AUE), and comparator (234f) receiving the analog voltage (ALE).

The comparators using the ramp waveform on node (230) generate outputs feeding analog one-shots (236a), (236b), (236c) that generate video dots forming horizontal segments, with the vertical position of the segments determined by the voltage level of the analog voltages (CUE), (CLE) or in the case of the X-axis the ground potential is used as a reference. The comparators receiving the ramp waveform on node (232), however, must generate a single horizontal scan line segment and thus the comparator outputs trigger digital one-shots (238a), (238b), (238c), and (238d) which must fire only once per vertical pulse (V) and for a delay period equal to the time between horizontal pulses (H).

Figure 7:
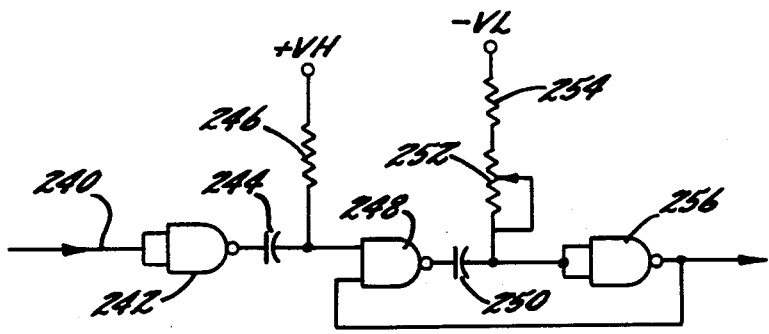
FIG. 7 is a detailed electronic schematic of the triggerable one-shot used to form the width of the vertical segments on the CRT display.

The analog one-shots (236a), (236b), (236c) are shown in more detail in FIG. 7. The comparator output on line (240) is buffered by a NAND gate inverter (242). The falling transition of the output of the inverter (242) is then detected and turned into a pulse by a pulse-generating capacitor (244) and a pull-up resistor (246). The detected pulse then fires a one-shot comprising a NAND gate (248), a delay capacitor (250), a delay adjusting potentiometer (252) and a minimum delay setting restor (254) and a feedback inverter (256). The delay adjusting potentiometer (252) determines the horizontal width of the vertical segments generated by the analog one-shots.

Figure 8:
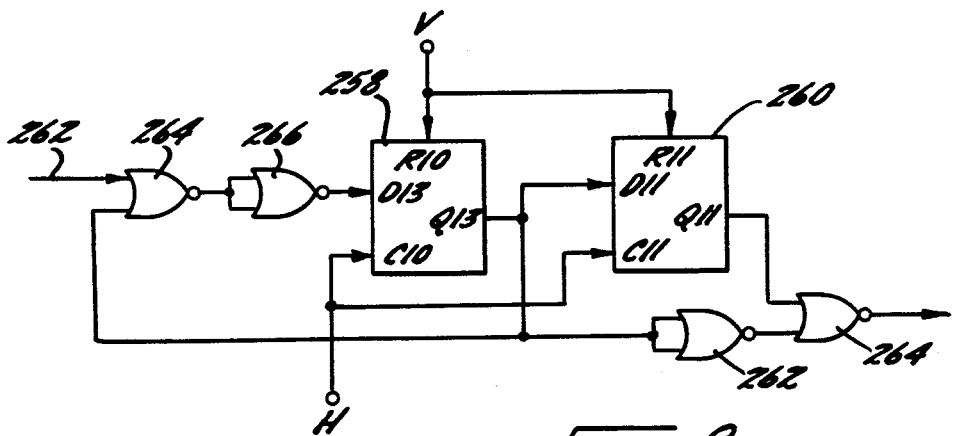
FIG. 8 is a detailed electronic schematic of the digital triggerable one-shot used to generate the horizontal segments on the CRT display.

FIG. 8 gives a more detailed description of the digital one-shots (238a), (238b), and (238c). The digital one-shots are activated once per vertical frame by the vertical synchronizing pulse (V) applied to the reset inputs (R10), (R11) of two D-type flip-flops (258) and (260), respectively. The comparator output is received on line (262) fed to the D input (D13) of the flip-flop (258) through NOR gates (264) and (266). The flip-flop (258) is clocked on an input (C10) by the horizontal synchronization pulses (H) and the output (Q13) is fed back to the input of NOR gate (264) so that the flip-flop (258) is set only once per horizontal line when the comparator output on input (262) goes from low to high. The second flip-flop (260) receives the output (Q13) on its D input (D11) and is also re-set by the vertical pulse (V) on its re-set input (R11) and is clocked by the horizontal pulses (H) on its clock input (C11) so that the second flip-flop (260) delays the signal from the first flip-flop (258) by one horizontal period. A rising edge-detecting logic circuit consisting of inverter (262) and NOR GATE (264) generates a pulse of width exactly one horizontal period (H) when the second flip-flop (260) receives the signal from the first flip-flop (258). Thus a low to high transition on the input line (262) generates a single pulse having a width of one horizontal period but only once for each vertical synchronization pulse (V).

The outputs of the one-shots (236a), (236b), (236c), (238a), (238b), (238c) all generate video signals. But it is desirable to have some way of distinguishing these signals when they are displayed on the cathode ray tube (180). For this purpose the outputs of the axis one-shots (236a), (238a) are combined by a NOR gate (268) so that they may generate video signals that have a low intensity determined by a relatively high resistance video summing resistor (270). On the other hand the other one-shot outputs are combined by a NOR gate (272) that then are summed by a video summing resistor (274) having a relatively low resistance so that they generate video signals appearing with bright intensity on the cathode ray tube (180). It is also desirable to visually distinguish the signals generated by the sensors looking at the lower plate cylinder (24) from the signals looking at the upper plate cylinder (22). For this purpose the outputs of the one-shot (236c) and (238c) are modulated using gates (276), (278), respectively, in order to generate dashed segments on the cathode ray tube (180). The vertical segment must be blank once every other horizontal line so that the gate (276) is enabled by the output of a digital divider comprising a D-type flip-flop (280) clocked via an input (C9') by the horizontal sync pulses (H) and with its complement output ($\overline{Q9'}$) fed back to its D input (D9'). The horizontal segments, on the other hand, must be modulated by the character dot reference oscillator (188) and thus the gate (278) is enabled by the output of a digital divider comprising flip-flop (282) clocked via its clock input (C12) receiving the signal from the character dot reference oscillator (188) and with its complement output ($\overline{Q12}$) fed back to its D input (D12).

If a color CRT is used for the cathode ray tube (180), then the one-shots could also have their output signals fed to different color control grids (not shown) of the CRT so that the different line segments from the different sensors will generate different colors.

If the display driver circuits (182) are used with a character generator, the the character dots (CHAR DOTS) coming out of the character generator shift register (not shown) are added to the segments generated by the one-shots using an OR gate (284) so that the horizontal and vertical segments may be annotated with character information.

It is also possible to localize the displayed segments by blanking out portions of the segments and only enabling the segments to be seen when they are within the screen addresses specified by the column address counter (190) and the row address counter (192). For this purpose a display blanking signal is generated by a NOR gate (286) when either of the origin counters (194), (198) are counting or when the column address counter (190) or the row address counter (192) has counted up to its most significant binary output (MSB) on lines (212) and (220), respectively. The display blanking signal ($\overline{\text{DISP. BLANK}}$) then disables the video signals generated by the one-shots by disabling NAND gates (288) and (290).

It is also possible to duplicate the circuits in FIG. 6 except for the character dot reference oscillator (188), the raster generator chip (186), and the video driver circuits generally designated (188) in order to generate a plurality of coordinate graphs (10) each at any selectable location on the face of the cathode ray tube (180). These locations of the individual coordinate systems are selected by strapping in different addresses on the jumpered outputs of the duplicated origin counters (194) and (198). Also the size of the different coordinate systems can be varied by varying the number of output bits on the duplicated column address counters (190) and duplicated row address counters (192).

For the purpose of completeness the video driver circuits generally designate (188) in FIG. 8 will be described. The raster generator chip (186), in addition to generating the horizontal (H) and vertical (V) synchronization signals, generates a combined synchronization signal (SNYC) and a combined blanking signal (BLANK). The blanking signal is used to turn off the video signal that is summed on node (300) by means of a transistor switch comprising level shifting resistors (302), and (304), a transistor (306), a current limiting resistor (308), switching diodes (310), (312) and a biasing resistor (314). The combined video signal on the summing node (300) is added to the synchronization signal (SYNC) using summing resistors (316) and (318) which generate a combined signal on node (320). This combined signal is buffered by an emitter follower transistor (322) having a load resistor (324) tied to the minus supply (−V1) generating a signal passed through an impedance matching resistor (323) to the video cable (326) driving the cathode ray tube (180).

Another desirable feature of a coordinate system display (7) is that the scale of the coordinate system may be varied. For this purpose the ramp waveforms on nodes (230) and (232) are scaled by scaling resistors (328) and (330), respectively. This scaling may be accomplished by remote control using electronic switches (332) and (334), respectively, that may switch in a pre-determined resistance value (336) and (338) respectively. The electronic switches, typically CMOS devices part no. 4016, are controlled by a common line (333) accepting a scale control signal (SCALE). Also to further facilitate the scaling on the cathode ray tube (180) X, Y display (7) a scaling grid (10) shown in FIG. 1 may be physically engraved on a face plate placed in front of the X, Y display (7). The viewer can easily follow the display changes caused by the scaling factor selection performed by the scale control signal (SCALE) if the scaling grid (10) has sub-divisions such that the ratios of the pre-determined scale factors set by the scaling resistors (336), (338) correspond to integral multiples of the sub-divisions. For example, if the resistors (336), (338) are selected with a resistance equal to the impedance at nodes (230), (232) (which of course is the parallel combination of the R-2R ladder resistance of value R with the value of the scaling resistor (328) or (330), respectively) then there should be an even number of scale sub-divisions per major scale division since the perpendicular displacements of the video segments displayed on the X, Y display (7) are doubled when the scale control signal (SCALE) is switched from a logic zero to a logic 1.

What is claimed is:

1. A remote monitoring system for at least one rotary printing press having a plurality of plate cylinders, said remote monitoring system comprising, in combination,
   (a) a plurality of optical scanners sensing the axial and peripheral displacements of the printing plates on said plate cylinders and generating respective electronic measurement signals indicating said axial and peripheral displacements,
   (b) input selector means for receiving an indication of a group of plate cylinders to be remotely monitored,
   (c) switching means, responsive to the indication received by the input selector means and having a plurality of output lines, for switching to the output lines the electronic measurement signals indicating the axial and peripheral displacements of the selected group of plate cylinders to be remotely monitored,
   (d) electronic display means for displaying on a two-dimensional display area at least one predefined visual symbol for each plate cylinder in the selected group of plate cylinders, said electronic display means including means responsive to the electronic measurement signals on the output lines of said switching means for positioning the visual symbols for the respective plate cylinders at respective positions, along a first direction, responsive to the respective electronic measurement signals representing said axial displacements and at respective positions, along a second generally orthogonal direction, responsive to the respective electronic measurement signals representing said peripheral displacements.

2. The combination as claimed in claim 1 further comprising means for selecting one of the electronic measurement signals indicating peripheral displacement as a zero reference signal, so that the displayed visual symbols having respective positions responsive to said peripheral displacements have positions indicating the corresponding deviations from the zero reference signal.

3. The combination as claimed in claim 2, wherein said means responsive to the electronic measurement signals has means for positioning the visual symbols along said first and second directions at respective positions generally proportional to said respective axial and peripheral displacements.

4. The combination as claimed in claim 3, wherein said means for positioning includes variable scaling means for setting the axial and peripheral proportions of measured displacement to displayed symbol position to a plurality of predetermined scale factors.

5. The combination as claimed in claim 4, wherein the electronic display means further comprises means for displaying visual symbols indicating the selected scale factors so that the display is annotated.

6. The combination as claimed in claim 4, wherein the electronic display means further comprises a scale grid on the two-dimensional display area with the ratios of the predetermined scale factors corresponding to integral multiples of subdivision of the scale grid so that the viewer can easily follow display changes caused by scale factor selections.

7. The combination as claimed in claim 3, wherein the predefined visual symbols include line segments and a change in measured displacement is indicated by a translation of the respective segment generally perpendicular to the direction of the segment.

8. The combination as claimed in claim 3, wherein the display means includes a cathode ray tube thereby providing a high-resolution, large area display.

9. The combination as claimed in claim 8, wherein the cathode ray tube is a color tube and the display means further has color driving means for displaying the predefined symbol in different colors for different plate cylinders so that the symbols for different plate cylinders are easily distinguished.

10. A remote monitoring system for at least one rotary printing press having a plurality of plate cylinders, said remote monitoring system comprising, in combination,
    (a) a plurality of optical scanners sensing the axial and peripheral displacements of the printing plates on said plate cylinders and generating respective electronic measurement signals indicating said axial and peripheral displacements,
    (b) input selector means for receiving an indication of a group of plate cylinders to be remotely monitored,
    (c) switching means, responsive to the indication received by the input selector means and having a plurality of output lines, for switching to the output lines the electronic measurement signals indicating the axial and peripheral displacements of the selected group of plate cylinders to be remotely monitored, (d) electronic display means for displaying on a two-dimensional display area at least one predefined distinct visual symbol for each plate cylinder in the selected group of plate cylinders, said electronic display means including means responsive to the electronic measurement signals on the output lines of said switching means for positioning the visual symbols for the respective plate cylinders at respective positions, along a first direction, generally proportional to the respective electronic measurement signals representing said axial displacements and at respective positions, along a second generally orthogonal direction, generally proportional to the respective electronic measurement signals representing said peripheral displacements.

11. The combination as claimed in claim 10 wherein the predefined symbol for one plate cylinder includes a solid line segment and the predefined symbol for another plate cylinder includes a dashed line segment.

12. The combination as claimed in claim 10 wherein the predefined symbol for one plate cylinder is distinguished by color from the predefined symbol for another plate cylinder.

* * * * *